United States Patent
Marzorati et al.

(10) Patent No.: US 11,531,805 B1
(45) Date of Patent: Dec. 20, 2022

(54) MESSAGE COMPOSITION AND CUSTOMIZATION IN A USER HANDWRITING STYLE

(71) Applicant: KYNDRYL, INC., New York, NY (US)

(72) Inventors: Mauro Marzorati, Lutz, FL (US); Shikhar Kwatra, San Jose, CA (US); Raghuveer P. Nagar, Kota (IN); Reji Jose, Bangalore (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/643,432

(22) Filed: Dec. 9, 2021

(51) Int. Cl.
| | |
|---|---|
| *G06F 17/00* | (2019.01) |
| *G06F 40/109* | (2020.01) |
| *G06V 30/226* | (2022.01) |
| *G06V 30/262* | (2022.01) |

(52) U.S. Cl.
CPC .......... *G06F 40/109* (2020.01); *G06V 30/226* (2022.01); *G06V 30/262* (2022.01)

(58) Field of Classification Search
CPC ... G06F 40/109; G06V 30/226; G06V 30/262
See application file for complete search history.

(56) References Cited

U.S. PATENT DOCUMENTS

| | | | |
|---|---|---|---|
| 5,327,342 A | 7/1994 | Roy | |
| 6,304,898 B1 | 10/2001 | Shiigi | |
| 7,302,099 B2 | 11/2007 | Zhang et al. | |
| 7,496,547 B2 | 2/2009 | Abdulkader et al. | |
| 8,749,800 B2 * | 6/2014 | Rimai | G06V 30/347 715/236 |
| 9,589,200 B2 | 3/2017 | Hoshi et al. | |
| 10,505,875 B1 * | 12/2019 | Jenks | H04L 51/02 |
| 11,320,982 B2 * | 5/2022 | Chaudhri | G06F 3/04883 |
| 2001/0048436 A1 * | 12/2001 | Sanger | G06F 40/109 345/467 |
| 2004/0082839 A1 | 4/2004 | Haugen | |
| 2005/0288954 A1 * | 12/2005 | McCarthy | G06Q 30/02 705/2 |

(Continued)

FOREIGN PATENT DOCUMENTS

| | | |
|---|---|---|
| CN | 105847597 A | 3/2020 |
| KR | 20000036448 A | 7/2000 |
| WO | WO2021140575 A1 | 5/2021 |

OTHER PUBLICATIONS

Winkleman, S., "The best postcard apps to help you embrace snail mail", Digital Trends, Dec. 22, 2017, 7 pgs.

(Continued)

*Primary Examiner* — Laurie A Ries
(74) *Attorney, Agent, or Firm* — Erik Swanson; Matthew M. Hulihan; Heslin Rothenberg Farley & Mesiti PC

(57) ABSTRACT

Message composition and customization in a user's handwriting style includes obtaining electronic source text from a user, the electronic source text to be sent to a recipient, ascertaining properties of the electronic source text, the properties including words used in the electronic source text and a context of the electronic source text, and the context including an emotion of the electronic source text, and building an electronic message based on the ascertained properties, the electronic message including the electronic source text presented graphically in a handwriting style of the user.

19 Claims, 12 Drawing Sheets

(56) References Cited

U.S. PATENT DOCUMENTS

| | | | | |
|---|---|---|---|---|
| 2011/0055675 A1* | 3/2011 | Sakai | ................... | G06F 40/169 |
| | | | | 715/200 |
| 2011/0184736 A1* | 7/2011 | Slotznick | ............ | G10L 15/1815 |
| | | | | 704/E15.001 |
| 2012/0231774 A1* | 9/2012 | Blades | ................... | H04W 4/14 |
| | | | | 455/414.4 |
| 2014/0212007 A1* | 7/2014 | Oh | ....................... | G06F 40/109 |
| | | | | 382/119 |
| 2016/0004672 A1* | 1/2016 | Sakunkoo | ............... | H04L 51/08 |
| | | | | 715/269 |
| 2019/0303662 A1* | 10/2019 | Madhani | .............. | G06V 10/751 |
| 2021/0349606 A1* | 11/2021 | Chang | ................ | G06F 3/04842 |
| 2022/0012510 A1* | 1/2022 | Mirjan | ..................... | G06N 3/08 |
| 2022/0148326 A1* | 5/2022 | Tensmeyer | ............. | G06V 10/82 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

MESSAGE COMPOSITION AND CUSTOMIZATION IN A USER HANDWRITING STYLE

BACKGROUND

Historically, and particularly in the age of digital communication where text messages and emails are commonplace, handwritten letters have provided a personal touch to communications. A handwritten letter to an acquaintance can often engage the recipient in a more personal way than other forms of communication.

SUMMARY

Shortcomings of the prior art are overcome and additional advantages are provided through the provision of a computer-implemented method. The method obtains electronic source text from a user. The electronic source text is to be sent to a recipient. The method also ascertains properties of the electronic source text. The properties include words used in the electronic source text and a context of the electronic source text. The context includes an emotion of the electronic source text. Additionally, the method builds an electronic message based on the ascertained properties. The electronic message includes the electronic source text presented graphically in a handwriting style of the user.

Further, a computer system is provided that includes a memory and a processor in communication with the memory, wherein the computer system is configured to perform a method. The method obtains electronic source text from a user. The electronic source text is to be sent to a recipient. The method also ascertains properties of the electronic source text. The properties include words used in the electronic source text and a context of the electronic source text. The context includes an emotion of the electronic source text. Additionally, the method builds an electronic message based on the ascertained properties. The electronic message includes the electronic source text presented graphically in a handwriting style of the user.

Yet further, a computer program product including a computer readable storage medium readable by a processing circuit and storing instructions for execution by the processing circuit is provided for performing a method. The method obtains electronic source text from a user. The electronic source text is to be sent to a recipient. The method also ascertains properties of the electronic source text. The properties include words used in the electronic source text and a context of the electronic source text. The context includes an emotion of the electronic source text. Additionally, the method builds an electronic message based on the ascertained properties. The electronic message includes the electronic source text presented graphically in a handwriting style of the user.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for message composition and customization in a user's handwriting style. A process can build an electronic message based on source text, the electronic message presenting the source text in a handwriting style of a user. Each individual has a unique handwriting style in terms how the characters and words visually appear to viewers of the text. In accordance with aspects described herein, a message in a user's handwriting style can be built from source text automatically, i.e. without/absent the user handwriting that particular source text. The built message can be printed and conveyed either physically or electronically in a form that appears as if it were text handwritten by the user.

While handwritten letters impart a heightened level of engagement and personality between a message author and recipient, the time consumed when writing a message by hand is generally much greater than composing the message digitally using modern communication technology. The process of handwriting a message may also be more error-prone than digital composition. This is particularly true if a handwritten message of given content is to be sent to multiple recipients with each receiving his/her own handwritten copy; the message author is prone to fatigue and the probability of error is higher. Nevertheless, as mentioned above, there remains value in the personalized touch of a handwritten communication.

In some aspects disclosed herein, a smart system is provided to learn the handwriting of a user and build/produce, electronically, messages in the handwriting style of the user. The built messages can be printed and sent physically and/or sent electronically (as/with an email for instance), with the system learning the handwriting of the user from various data sources based on ingesting what user writes/has written on paper, intelligent whiteboards, and other devices, as examples.

Additionally in some aspects, a system learns common words and phrases that the user uses in various contexts of handwritten messages (including in situations of given emotions) and builds a knowledge corpus. Then when the user utilizes aspects described herein to produce a message in the user's handwriting style, the context/emotion being conveyed by the source text is determined and words/phrases can be suggested accordingly.

In yet other aspects, a user's knowledge corpus for different languages along with the context/emotion being conveyed by the source text is used to build the message for the user in a different language. For example, a user fluent in English, Spanish and French can dictate or type a source message in English, and a system could automatically translate the source message into Spanish and/or French in the user's handwriting style, depending on the context for the message, for instance the identity and/or locale of the recipients.

Figure 1:
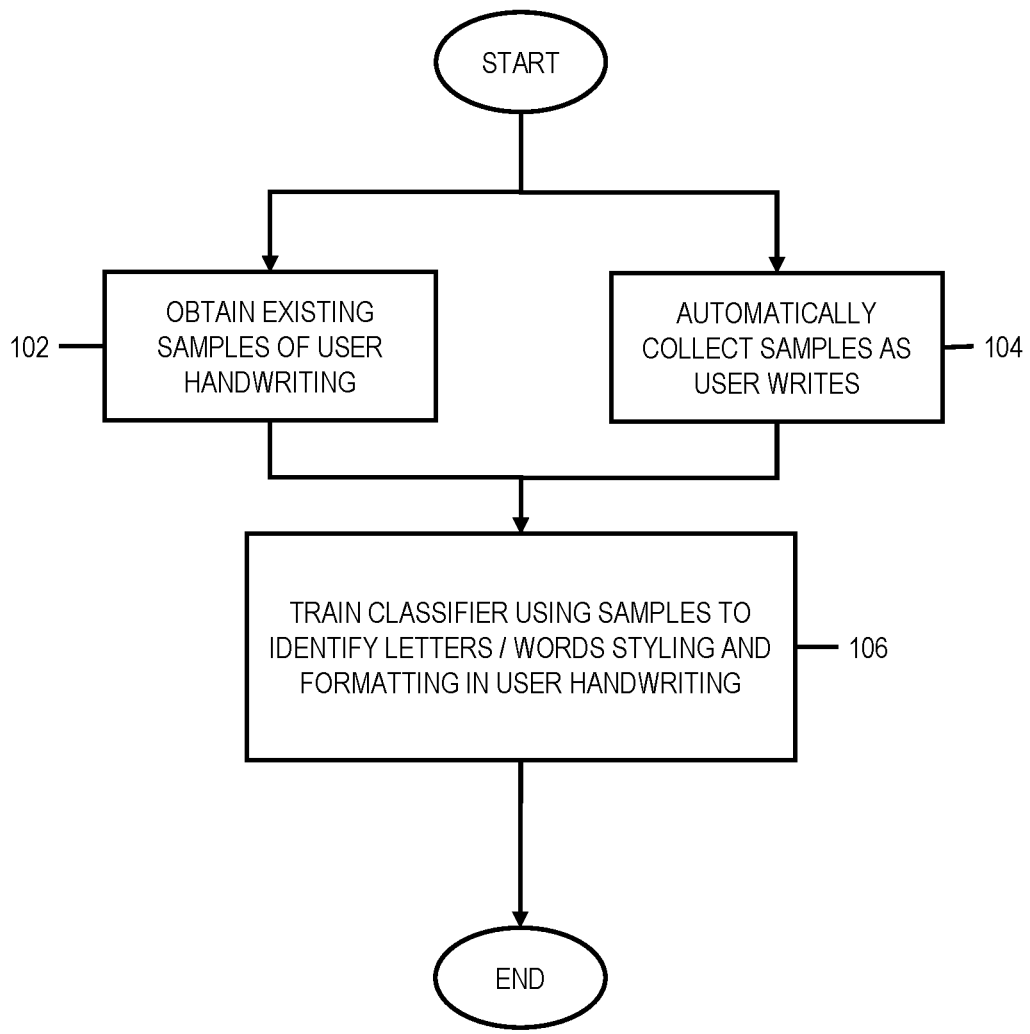
FIG. 1 depicts an example process for training a handwriting artificial intelligence model, in accordance with aspects described herein.

FIG. 1 depicts an example process for training a handwriting artificial intelligence (AI) model in accordance with aspects described herein. In embodiments, the AI model is a trained machine learning model, for instance a classifier, and the process of FIG. 1 can be performed by one or more computer systems to train the classifier to classify and learn the handwriting style of a user, for instance the styling, formatting, and other characteristics of writing words and characters, and properties (length, direction, etc.) of user strokes when writing characters/words. In some embodiments, the classifier is a cascade classifier and more particularly a cascade Region Based Convolutional Neural Network (R-CNN) classifier. The classifier can also identify these characteristics in different contexts of the user's writing, for instance when certain emotions are being expressed.

In particular, the training can train the classifier using handwriting samples of the user's handwriting to learn the handwriting style of the user. In this regard, the process acquires handwriting samples used to train the classifier from existing physical handwriting samples (102) such as messages the user has physically written on paper, and/or collects samples as the user writes (104), for instance samples of user interactions with interactive whiteboard(s) on which the user handwrites words and/or device(s) with a touchscreen or other input interface on which the user handwrites words, as examples.

Thus, a system performing the process of FIG. 1 to learn the handwriting of a user can be provided with samples of the user's handwriting. If there are samples already available from text/messages that the user had previously written, the system can use these to learn. Additionally or alternatively, if there are no such samples readily available then the user could be prompted to handwrite sample text that the system can use to learn the handwriting.

Samples can be automatically collected from various data sources such as papers, interactive whiteboards, and devices such as smart phones or tablets on which users can write characters/words by drawing on their touchscreen displays using a stylus or finger. In examples, the samples are annotated as to provenance, as user hand position might vary depending on whether the user is writing on a whiteboard, with a pencil/pen, or with a stylus, and these might produce subtle differences in how the user shapes the same letter depending on where/how written.

The process can then train (106) the classifier using the samples to identify character/word styling and formatting in the user's handwriting.

In particular embodiments, the user's actions and direction of tracing are segmented into multiple grids and fed to a classifier, such as one leveraging convolutional neural network (s) (CNN(s)), such as the R-CNN discussed above, to train that model/classifier to recognize how a user writes letters/words. Multiple CNN kernels (filters) can be selected with stride of 1 (as an example) running across a grid, and horizontal and vertical kernel information from the cascade CNN can be taken to account for the user's intended style and formatting. Accordingly, the cascade CNN take horizontal and vertical kernel information to understand the pixel-by-pixel information of how the user writes and correlate that with different writing styles (say cursive, bold, italics, degree of inclination, etc.). This is just one example of image recognition being used in understanding the writing style and format of the user.

It is also noted that directional styling templates can be created based on characteristics of user's strokes and ingesting these strokes into a data corpus. A cascade CNN technique can be used to identify the user's stroke, direction, and other properties to understand writing style, format and other/included properties such as writing time, space utilized between words, how often and where the writing instrument is lifted, etc.). Such properties can also be leveraged to attain a better understanding of the user. Properties of users' writings can correlate to different personality types, for example. The properties of a particular user's writing might be classified using a model in order to gain an understanding of various aspects of the user. This can be useful in understanding situations in which personalization through user handwriting might be desired.

This learning can be repeated for each of the languages that the user intends to use for building messages from user handwriting, in accordance with aspects described herein.

In a situation where some of the user's handwritten samples are from documents and messages that the user had written previously, the system can also build via this training a personal knowledge corpus of the words and phrases that the user uses. This builds a knowledge corpus of words and phrases typically used by the user in handwritten messages in varying contexts, as the system can learn the context (including for instance emotion) conveyed by each sample. The cascade classifier (as an example) can include CNNs working together for an understanding of the user's style, while another model can be used to map the context of a message to the user's personality and emotion, using NLP techniques for instance.

The system can store the trained model(s) against a profile of the user for further use and updating, for instance as additional user handwriting samples are gathered.

Figure 2A:
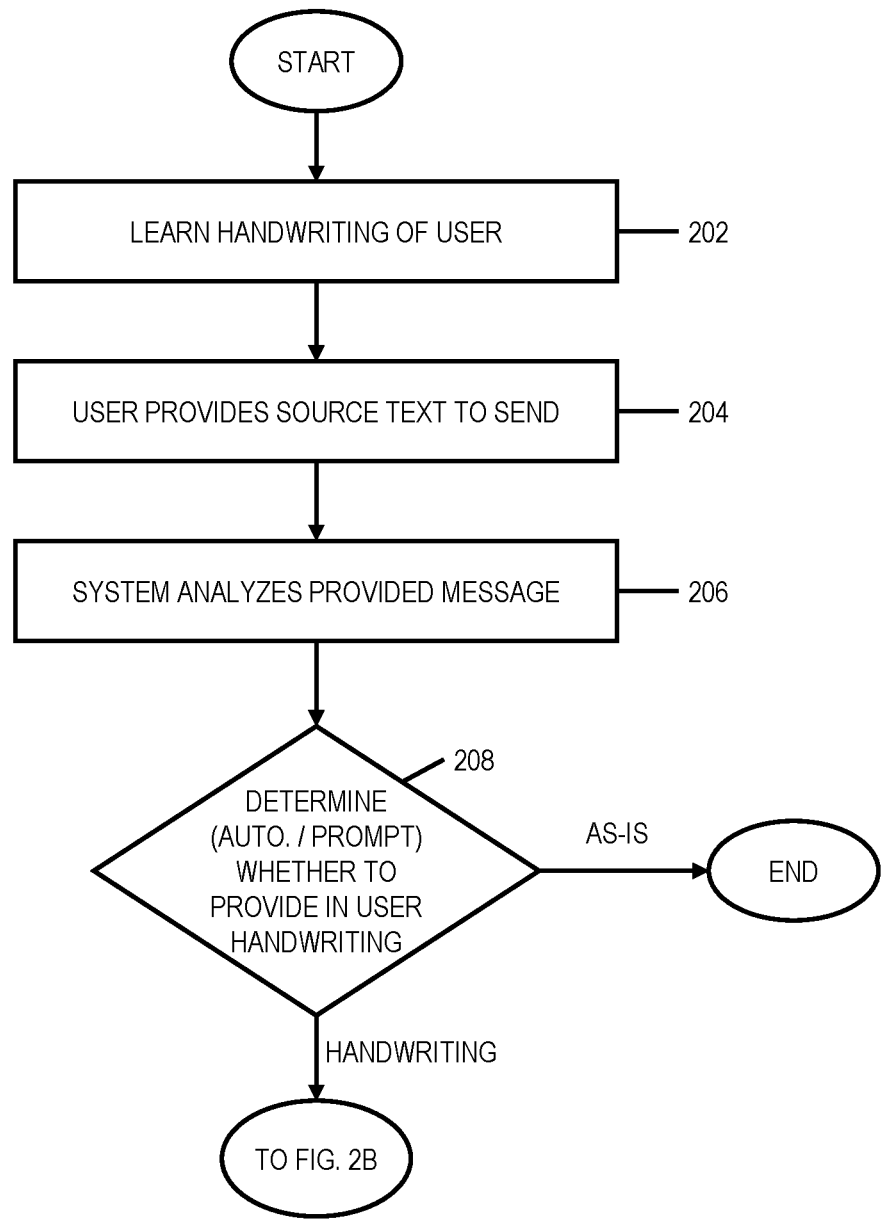
FIGS. 2A-2B depict an example process for message composition and customization in a user handwriting style, in accordance with aspects described herein.
Figure 2B:
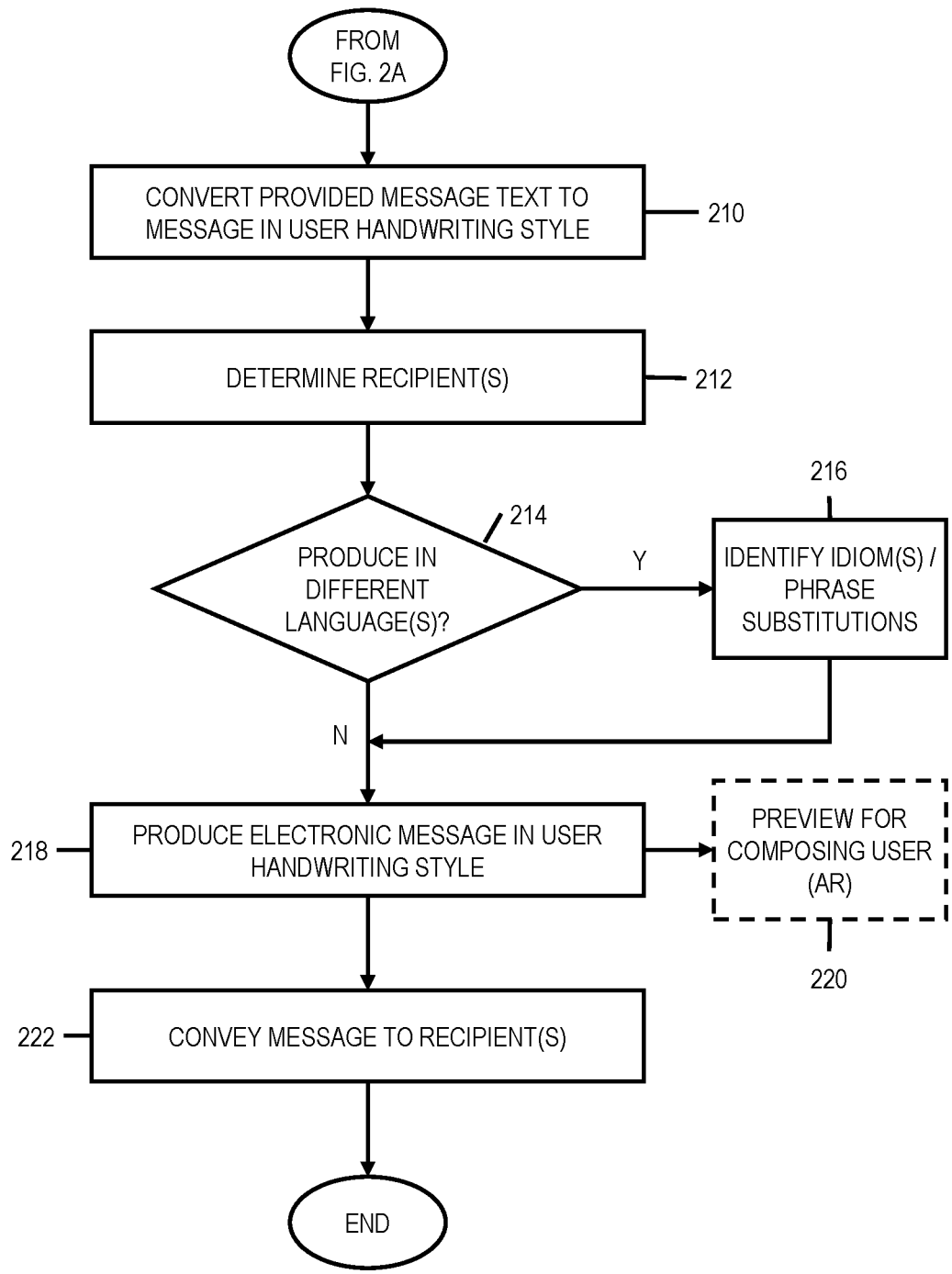

With a trained classifier, a process for message composition and customization in a user handwriting style is provided, an example of such process is presented in FIGS. 2A-2B. Aspects of the process can be performed by one or more computers systems (referred to as "system" herein).

Initially, as explained above, the process learns (202) the handwriting of the user, for instance using the process of FIG. 1. The process of FIG. 2 proceeds with the user providing (204) source text to send. The computer system(s) obtain this source text as electronic source text from the user, where the electronic source text is to be sent to one or more recipient(s). In embodiments, the electronic source text is provided as a digital image (e.g. scan or picture) of a message presented on a physical medium. For example, the source text could be a message printed (by a printer) or already handwritten by the user or someone other than the user. In the case of a computer-printed document, the document can be scanned and ingested by the system(s). In the case of a handwritten document, the user can provide the document to the system(s) in the handwritten format and the system(s) could scan the document and identify the characters/words therein.

Figure 3A:
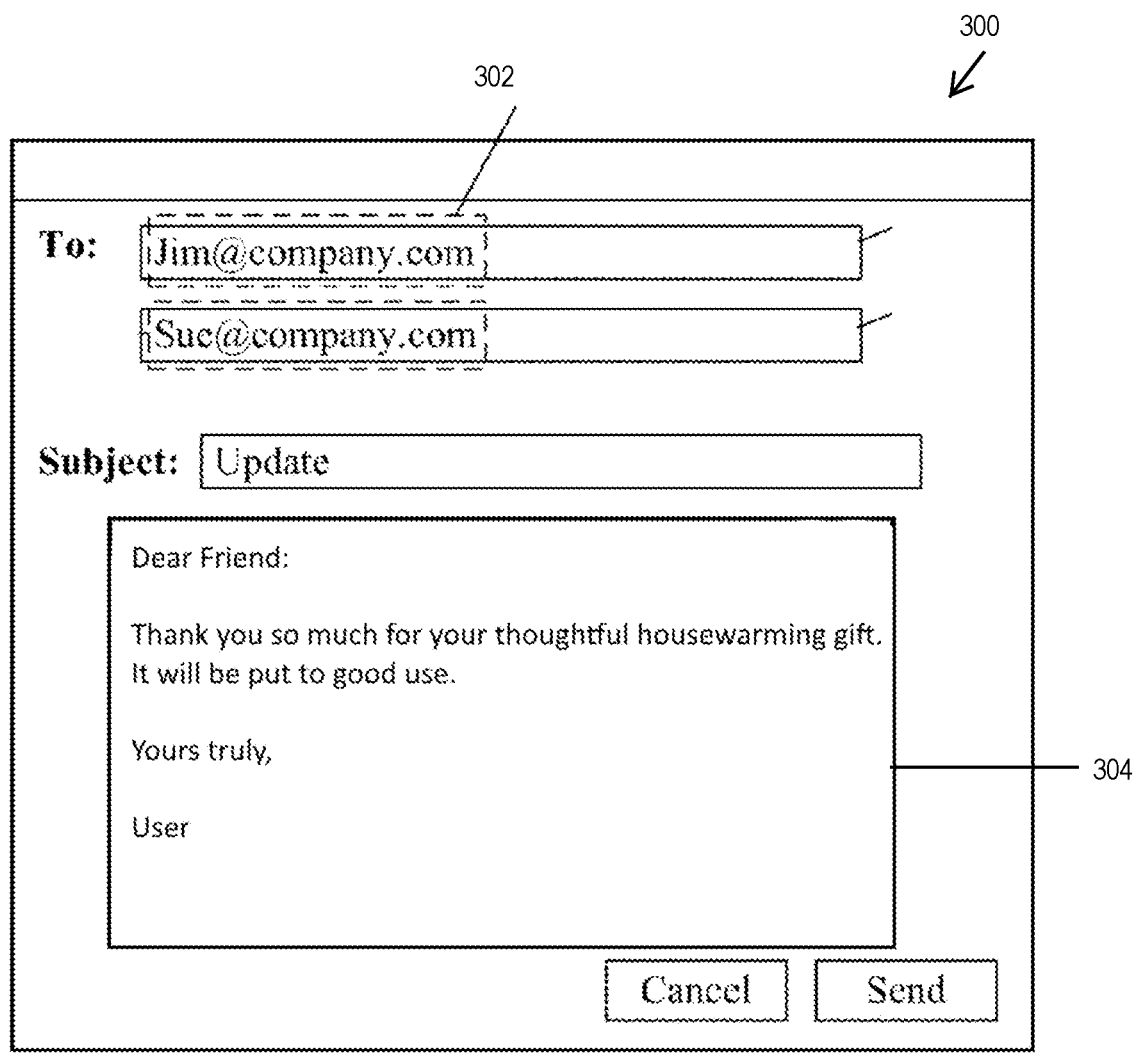
FIGS. 3A-3B depict an example of email message composition and customization in a user handwriting style, in accordance with aspects described herein.
Figure 3B:
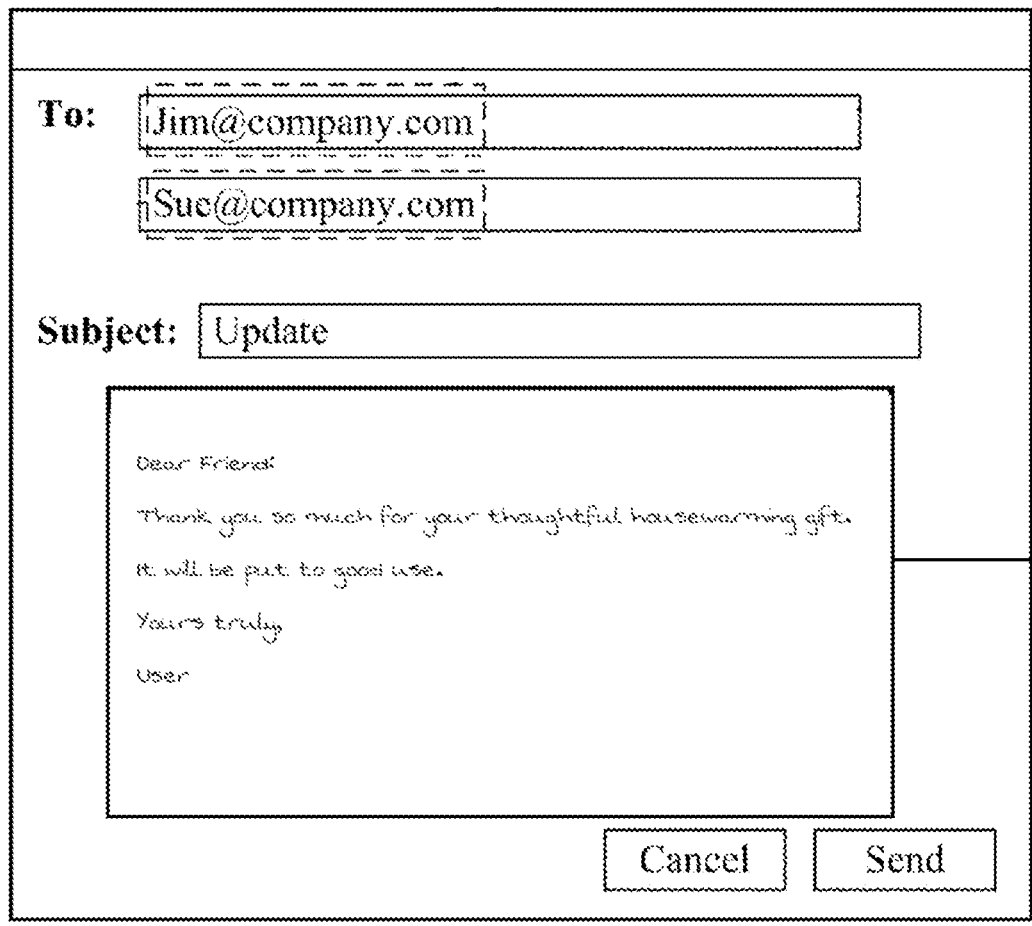

Additionally or alternatively, the source text could be a typed message (as an email, word processing document, etc.) from the user. Documents in popular document formats that include a message could be obtained for potential composition in the user's handwriting style. Alternatively, the user might compose the message electronically in an email application interface, for instance. FIGS. 3A-3C depict an example of email message composition and customization in a user handwriting style, in accordance with aspects described herein, with FIG. 3A presenting an email application interface, specifically an interface 300 to compose an email message to two recipients 302 in this case.

Additionally or alternatively, the source text could be a transcribed dictation from the user. In this embodiment, the user has dictated content through an interfacing smart assistant or microphone connected to a computer system (as examples) and the computer system uses language recognition to build electronic source text from what the user dictated.

In any of the above cases, the system obtains source text as electronic source text whether composed electronically by the user or acquired/converted from speech, images, or other documents.

Based on source message entry/acquisition, the completion of which might be user-defined by invoking a command or clicking an interface button for instance, the process analyses (206) the electronic source text and ascertains properties of the electronic source text. The properties can include, as examples, words used in the electronic source text and a context of the electronic source text, where the context includes an emotion of the electronic source text (i.e. emotion expressed therein).

The process, as part of this, can identify characters, words, context/emotion, and other properties that the user intends to express through the source text. If the user is dictating the text to the system, context, such as emotion, might be identified based on the tone of the user's voice. Additionally, idioms and common phrases in the language that the user uses can also be identified. In the case of dictation, the pitch, pace, and/or tone of the dictation can influence the calligraphic style of the transcribed output. The user can place emphasis on various content while dictating to signify different styles, for instance text that is to be in bold and italics style versus other text that is to be in italics, and other text that is to be 'normal'.

The process proceeds by determining (208)—automatically or via prompting the user—whether to provide the source text in the user's handwriting style. In examples, the process prompts the user by displaying an option to convert the source text from to the user's handwriting style and the user can select for the system to convert or not convert. Alternatively, it could be automatically determined whether it is desired to convert the source text. In this regard, a trained machine learning model (such as the classifier discussed above or another model) can be applied to the ascertained context of the electronic source text (from 206). The trained machine learning model can be configured to classify whether to convert source text into the handwriting style of the user, and on this basis, the process might automatically determine, based on the applying, to build an electronic message with the source text visually presented in the handwriting style of the user as if handwritten by the user. In this regard, the machine learning model could predict whether or not the source text will be more impactful to the recipient(s) if presented in the composing user's handwriting style and either proceed automatically with the conversion or not, without displaying an option for the user to choose. Optionally, the process could provide its prediction as a recommendation to the user, after which the user could confirm whether to convert or not convert the source text.

If it is determined at 208 to not provide the source text in the user handwriting style (208, AS-IS), the process ends, for instance by providing the message as is. Alternatively, if it is determined at 208 to provide the source text in the user's handwriting style (208, HANDWRITING), the process proceeds to FIG. 2B.

Referring to FIG. 2B, the process converts (210) the provided message text to a message in the user's handwriting style. In this aspect, the process builds an electronic message based on the ascertained properties of the source text. The electronic message includes the electronic source text (some or all thereof) presented graphically in a handwriting style of the user. The building includes composing the ascertained words as graphical elements of characters automatically generated to visually appear in the handwriting style of the user as if they were handwritten by the user.

The composing can use the trained classifier to perform the conversion, in which the provided message text (source text) is fed into the classifier, which outputs the text in the user's handwriting style. In specific embodiments, an encoder-decoder network provides a digital representation of a sampled word and processes that information, for instance an auto-encoder network creates a virtual presentation of the labels (i.e. words written by the user) and a decoder network tracks this such that, when the decoder is to output a user's template of information, it can take the information from the cascade classifier and encoder network and create the user's formatting style for the test in the user's handwriting style and specific language. In this manner, an encoder-decoder network personalized to the user's writing style enables the system to understand sampled pieces of information, and create and apply a template for the user's style so that training can be performed initially and applied to new message text to convert it to the user's handwriting style.

In addition, the knowledge corpus discussed previously can be leveraged to determine based on the ascertained context words and phrases to suggest for inclusion in the electronic message as modifications to the text of the electronic source text—for instance to change word(s) or augment the source text, as examples.

The process also determines (212) recipient(s) to which the source message/text, built as an electronic message in the handwriting style of the user, is to be sent. In examples, the recipient(s) are already identified for the system, such as in the example of FIG. 3A in which the user has provided the email addresses of two recipients. Alternatively, for instance if no recipients are specified or in addition to those specified, the process can derive a list of probable intended recipients considering the user's contact list (names and addresses) and based on the content of the built message and the context (including emotion) expressed. The process can present the list to the user for editing (adding to or removing from) the list.

As an enhancement, the system can analyze any prior communications (verbal, written, etc.) involving the recipients as participants thereto and determine (214) whether a different language is to be used in building the electronic message in the user's handwriting style. In this regard, the electronic source text might be provided in a first language (of a plurality of languages) and the building of the electronic message in the handwriting style of the user could compose the text of the electronic source text in a second language (of the plurality of different languages) different from the first language. The process could prompt the user to indicate the second language, the user could explicitly indicate to the system that the electronic message is to be built in a different language (still in the user's handwriting style) and select that language, and/or the process could automatically select the second language, based for example on an ascertained context of the electronic source text, such as the identity of a recipient, prior communications between the user and the recipient, or other context.

It is noted that when there are multiple recipients, different electronic messages could be built in different languages for different recipients if desired. If there is a Spanish-speaking recipient to source text written in English, the built electronic message may be composed in Spanish words (in the user handwriting style). If there are other recipients on the message, the electronic message can be built for them in whatever language is appropriate for them, which might be English or a third language, for instance.

Additionally with respect to translation, in situations where source text is to be produced in a different language for certain recipient(s) and the composing user has used idiom(s) or other phrases familiar to the input (source/first) language, equivalent idiom(s) or phrase(s) in the target (second/recipient/output) language could be searched for. The process can therefore, if applicable, identify (216) idiom(s)/phrase substitutions where appropriate so that the source meaning accurately is conveyed more accurately in the second-language equivalent.

The process proceeds by building/producing (218) the electronic message in the user handwriting style. The building can account for composition of the content of the message, referring to the graphical elements of character/words, etc. in the handwriting style of the user, the recipients (and addresses/handles if the message is to be conveyed electronically), specific recipients with whom the user would like to communicate in a language different from the input language, and idiom/phrase substitutions in the output language to replace corresponding idioms/phrases of the source text in the input language, as explained above. Optionally the system can preview (220) the built message for the composing user, for instance using augmented reality as described below. Eventually, the process conveys (222) the message to the recipient(s).

Figure 4:
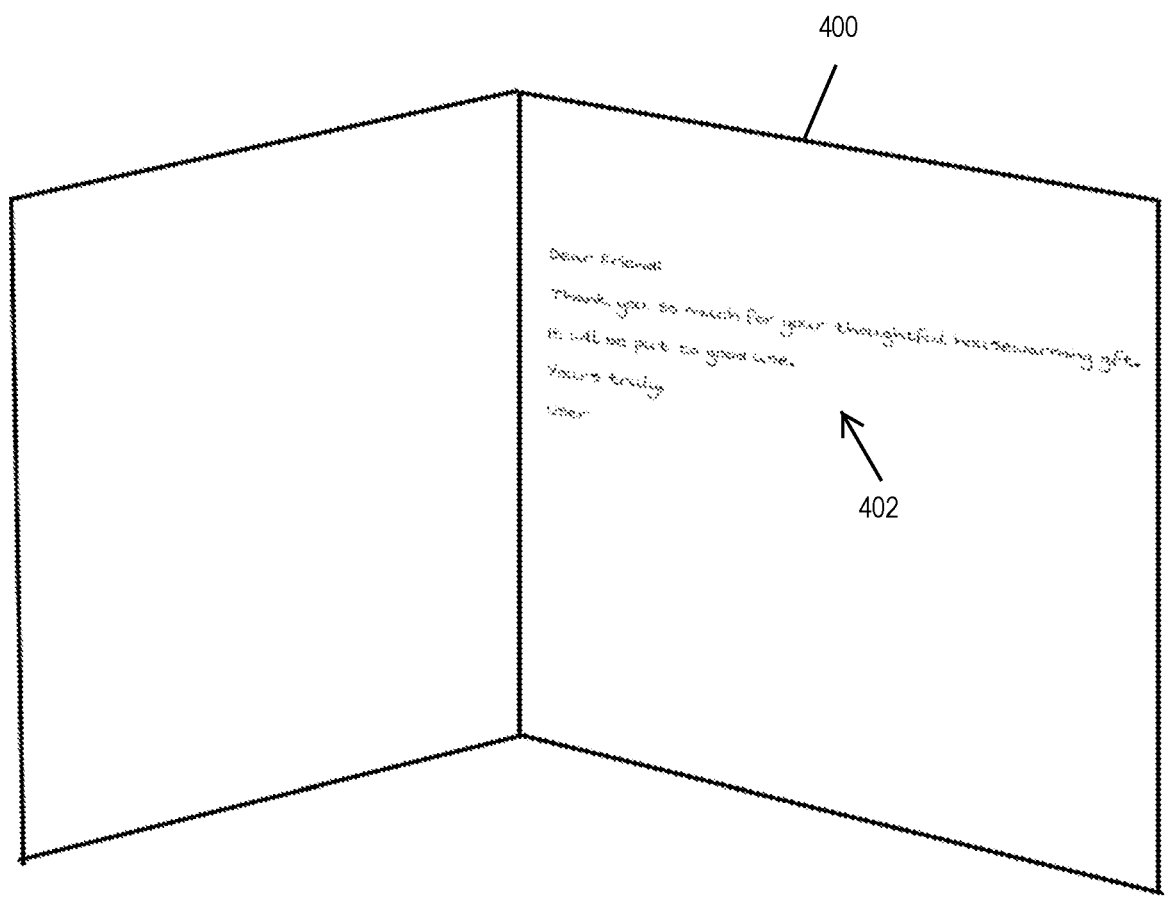
FIG. 4 depicts an example printed card based on a built message in a handwriting style of a user, in accordance with aspects described herein.

The system can generate the electronic message for delivery in any desired medium. In some examples, the electronic message is built and provided, converted, etc. into a document format, such as a word processing application format or a portable document format. Such document can be for either electronic delivery (email attachment, file upload, etc.) or physical delivery. In this latter regard, the user could print the document and mail it to the recipient(s). FIG. 4 depicts an example printed card based on a built message in a handwriting style of a user. Here, the user has printed (for instance using a printed coupled to the user's device) the electronic message in the handwriting style of the user. The printed card 400 has a printed (by the printer) message 402 that is the electronic message built in the handwriting style of the user. The user can mail or deliver this card to the recipient and the card may appear as if it was handwritten by the user.

The electronic message could also be provided electronically to the recipient(s). In examples, an application with which the user interacts could include or leverage the system for building the electronic message as described herein and present a 'print and mail' option for the message, enabling the user to print the electronic message as a letter, card, or the like and deliver it to the recipient(s). In particular embodiments, the electronic message building is offered as a service in an email platform that presents an option for the platform to automatically generate the electronic message in the user's handwriting style and print it, optionally for a fee. This option could be presented to users when composing an email message as an alternative that the user might consider instead of sending the email. This may be advantageous when a user initially composes an email message but prefers that it be made more personal by way of a message presented in the handwriting style of the user, rather than in a standard digital font that is not unique to the sender of the message.

By way of specific examples using email composition and delivery of a message, refer again to FIGS. 3A-3B, which depict an example of email message composition and customization in a user handwriting style. In FIG. 3A, a user is in the process of composing and sending an email using interface 300 to two recipients denoted by addresses 302. The user typed a message (source text) into compose window 304. Based on the user selecting the Send button, another interface element, or the system automatically triggering an action, aspects described above with reference to FIGS. 2A-2B could be performed automatically to build an electronic message in the user's handwriting style. That message can be previewed by the user. FIG. 3B presents an example such preview, in which window 304 has been updated to present the electronic message in the user's handwriting style. It is noted that the composition in the user's handwriting style could be implemented for presentation in any of various ways. In one example, the electronic message is built as an image or other graphical element that is inserted (e.g. as an image) into the email composition window 304. In another example, the system could create a custom font of the user's handwriting style so that the text is provided not as an image but in the characters of the font. This functionality might enable editing of the message directly in the handwriting style of the user, for instance to add or remove characters in the built message.

The words and language used in the built message of FIG. 3B are the exact same as the source text of FIG. 3A in this example, though in some examples, for instance involving language conversion/translation, the electronic message in 304 of FIG. 3B could be presented in the second language.

The preview might be useful to the user to see how the delivered message in the user's handwriting style would look to a recipient. In cases where the user speaks the second language, the preview would provide a way for that user to check the translation as well.

Assuming the user sends this message, the message can be delivered as an email (in this example) to the recipients. If one of the recipients is to receive the message in a second language, then the message that recipient receives can be in the second language while the message that the other recipient receives can be in the first (source) language—English in this example.

Figure 5A:
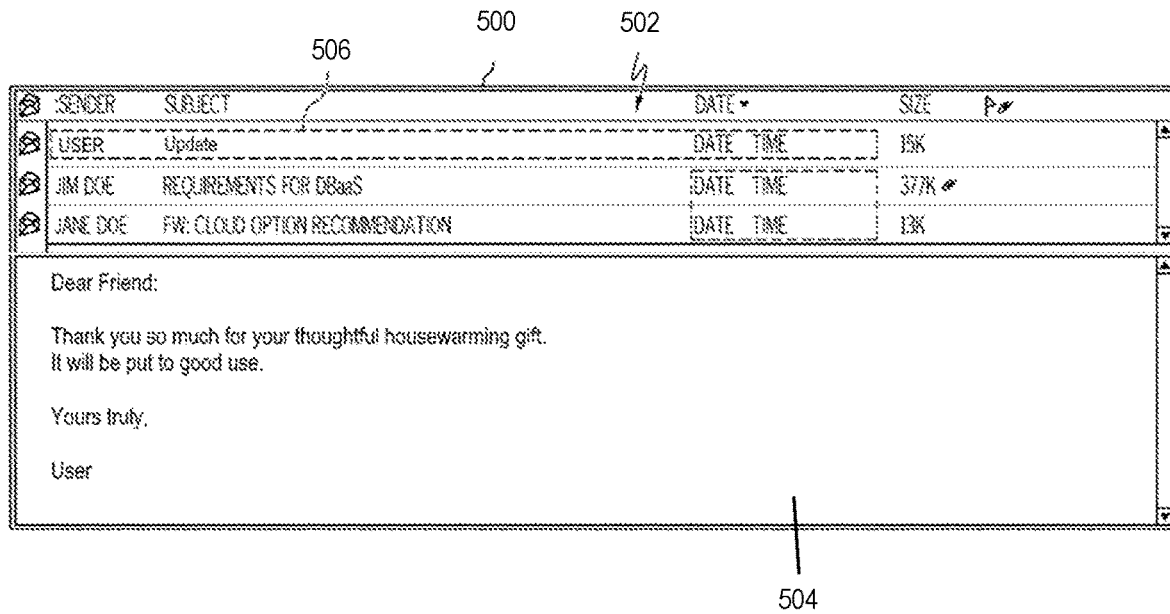
FIGS. 5A-5C depict example interfaces of a recipient email application for presenting a built message in a handwriting style of a user, in accordance with aspects described herein.
Figure 5B:
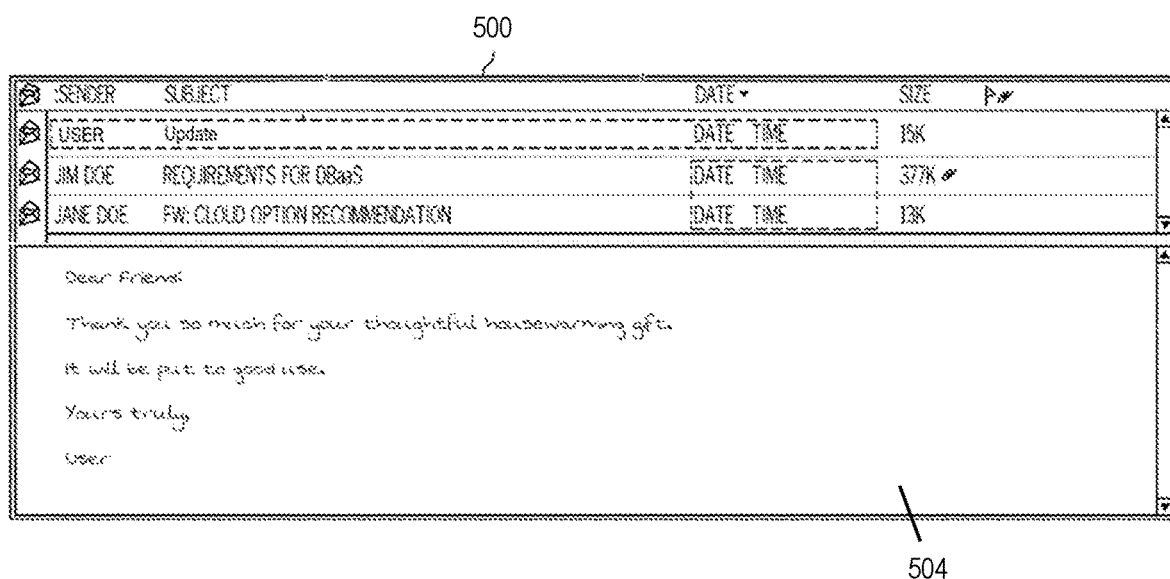
Figure 5C:
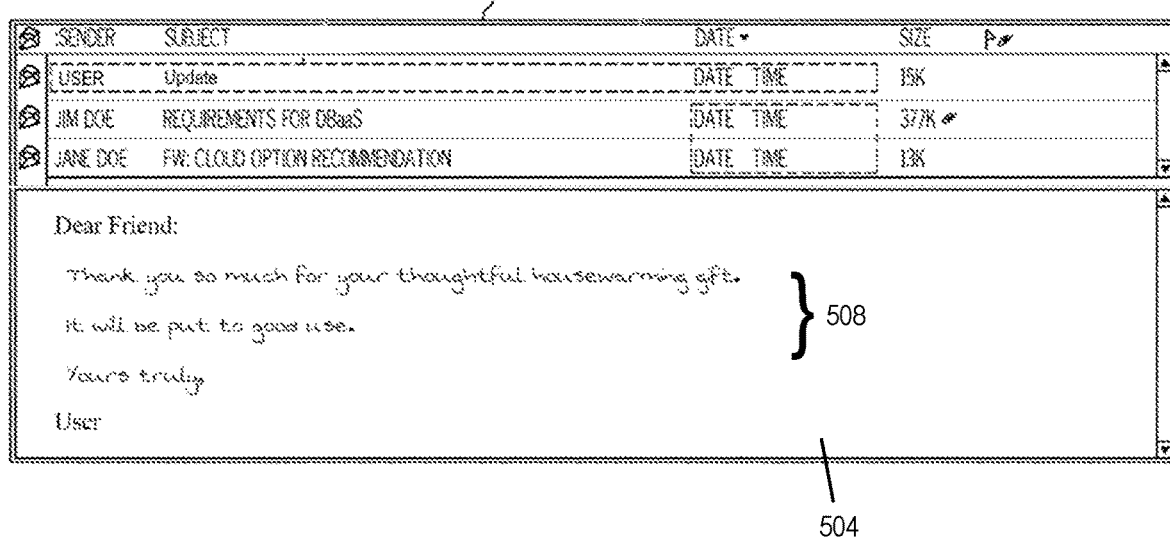

FIGS. 5A-5C depict example interfaces of a recipient email application for presenting a built message in a handwriting style of a user, in accordance with aspects described herein. Interface 500 presents a portion of an email client program executing on a recipient computer system, and specifically a message list window with a list 502 of messages and a message view pane 504. The recipient selects a message in the list—in this example the selected message 506 which is the message of FIG. 3A/3B from the sender. FIG. 5A presents what interface 500 depicts if the message is the source message text. Pane 504 shows how the message would be presented as a conventional email in which no user handwriting style were used. Alternatively, even in situations where the aspects of FIG. 2A-2B are followed and the built electronic message in the user handwriting style is conveyed, some embodiments might convey and allow the recipient to view the source text (e.g. as in FIG. 5A) as a selectable option.

In any case, FIG. 5B presents what the interface looks like if the message displayed is the electronic message in the user's (sender's) handwriting style. Specifically, view pane 504 of interface 500 shows the electronic message in the user's handwriting style.

In some embodiments, augmented reality (AR) may be used on the user (message composer) end and/or the recipient end. For instance, the sender could use an AR device (such as a smartphone with camera and display, or smart glasses as examples) to view on the AR device display how the built message would appear in the user's own handwriting style. A user composing the email as shown in FIG. 3A could put on AR glasses or use an AR application of the user's smartphone device in communication with the user's computer system or another system performing aspects of FIGS. 2A-2B, or otherwise activate AR functionality of a device that the user uses and the AR device can overlay the built electronic message over the composed email to present a view as shown in FIG. 3B. The built electronic message in FIG. 3B would be the built message in the user's handwriting style overlaying the original source email text (FIG. 3A) on a surface (a transparent display for instance) interposed between the user's eyes and the user's computer screen displaying the email message. In this aspect, a process can present a built electronic message in AR on an AR device of the user, where the AR device visually presents the electronic source text in the handwriting style of the user overlaying the electronic source text as the user gazes to the electronic source text on a display device.

AR could similarly be used on a receiving end. For instance, similar to the above in which the built electronic message is presented in AR overlaying the email message for the composing user, a recipient AR device could overlay the built electronic message in the user's handwriting over the received email message to present a view as shown in FIG. 5B for the recipient. It is also noted the AR could overlay a portion of the source text with text in the user's handwriting style but leave exposed some of the source text. FIG. 5C shows an example in which the view pane 504 of interface 500 shows electronic message text in the user's handwriting overlaying a portion of the message (508) but not the salutation ("Dear Friend") or closing ("User"). Aspects can therefore provide the electronic source text as an email along with the built electronic message for provision of the built electronic message on an AR device of the recipient to (at least partially) overlay the electronic source text of the email.

Figure 6:
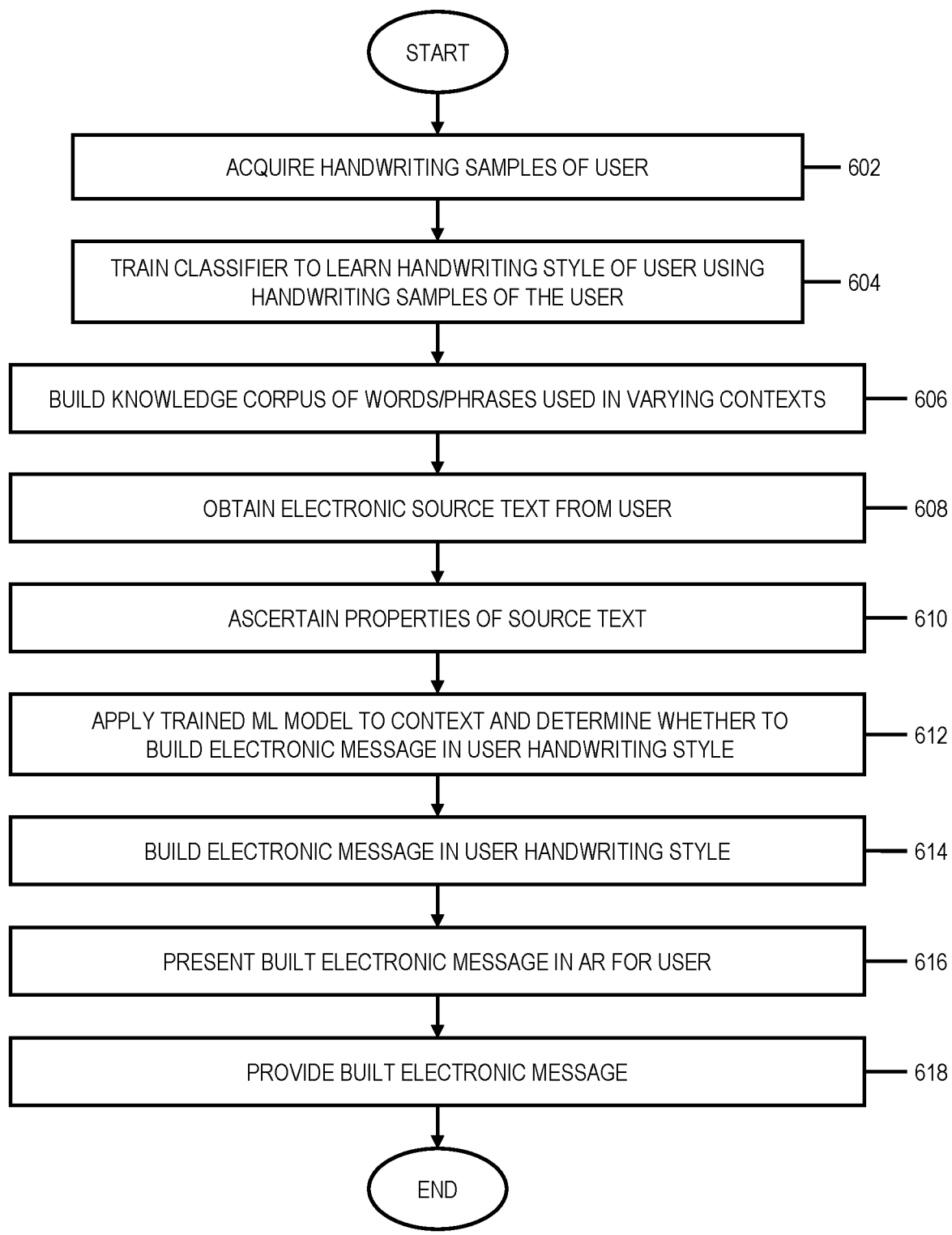
FIG. 6 depicts another example process for message composition and customization in a user handwriting style, in accordance with aspects described herein.

FIG. 6 depicts another example process for message composition and customization in a user handwriting style, in accordance with aspects described herein. In some examples, the process is performed by one or more computer systems, such as those described herein, which may include one or more computer systems of a user who composes or provides source text, as an example.

The process includes acquiring (602) handwriting samples of a user's handwriting and training (604) a classifier using the handwriting samples to learn the handwriting style of the user. At least some of the handwriting samples could be acquired from an interactive whiteboard on which the user handwrites words and/or a device with a touchscreen on which the user handwrites words of the at least some of the handwriting samples, as examples. The process also builds (606) a knowledge corpus of words and phrases typically used by the user in handwritten messages in varying contexts.

The process proceeds by obtaining (608) electronic source text from the user. The electronic source text is to be sent to one or more recipients. In examples, the electronic source text is provided by the user as a digital image of a message presented on a physical medium, a typed message, such as an email or document file, from the user and/or a transcribed dictation from the user. The process ascertains (610) properties of the electronic source text, which properties can include the words used in the electronic source text and a context of the electronic source text. The context can include an emotion expressed by the electronic source text for instance.

In this example, the process also applies (612) a trained machine learning (ML) model to the ascertained context of the electronic source text. This may be the classifier trained at 604 or could be a different ML model. The trained ML model can be configured to classify whether to convert input source text into the handwriting style of the user. On the basis of the application of the ML model to the context, the process determines whether to build the electronic message with the text source visually presented in the handwriting style of the user as if handwritten by the user. If so, the process continues, otherwise it ends. In other examples, the user selects to build the electronic message and no classifier is used to make an automatic determination/recommendation.

In continuing, the process builds (614) an electronic message based on the ascertained properties. The electronic message includes the electronic source text presented graphically in a handwriting style of the user. Building the electronic message can include composing the ascertained words as graphical elements of characters (e.g. as in FIGS. 3B, 4, 5B, 5C) automatically generated to visually appear in the handwriting style of the user as if handwritten by the user. In some examples this composition is made using an inverse cascade classifier.

In embodiments where a knowledge corpus is kept indicating words/phrases the user tends to use in handwriting in particular contexts, the process determines from the knowledge corpus, and based on the ascertained context of the source text, words and/or phrases to suggest for inclusion in the electronic message being built as modifications to the text of the electronic source text.

In embodiments, the electronic source text is provided in a first language of a plurality of languages, and building (614) the electronic message composes the text of the electronic source text in a second language, of the plurality of different languages, different from the first language. The process could automatically select the second language based on the ascertained context of the electronic source text, for instance if a recipient speaks in the second language and not the first. In cases where the electronic source text includes an idiom of the first language, the building can identify a substitute idiom of the second language to substitute for the idiom of the first language in the built electronic message.

The process optionally presents (616) the built electronic message in augmented reality (AR) on an AR device of the user, in which the AR device visually presents the electronic source text in the handwriting style of the user overlaying the electronic source text as the user gazes to the electronic source text on a display device.

In embodiments, the user prints and mails the built electronic message to the recipient(s). Additionally or alternatively, as in the process of FIG. 6, the process electronically provides (618) the built electronic message. In a particular embodiment involving email, the process provides the source text as an email to a recipient along with the built electronic message for provision of the built electronic message on an augmented reality device of the recipient to overlay the electronic source text of the email.

Although various examples are provided, variations are possible without departing from a spirit of the claimed aspects.

Figure 7:
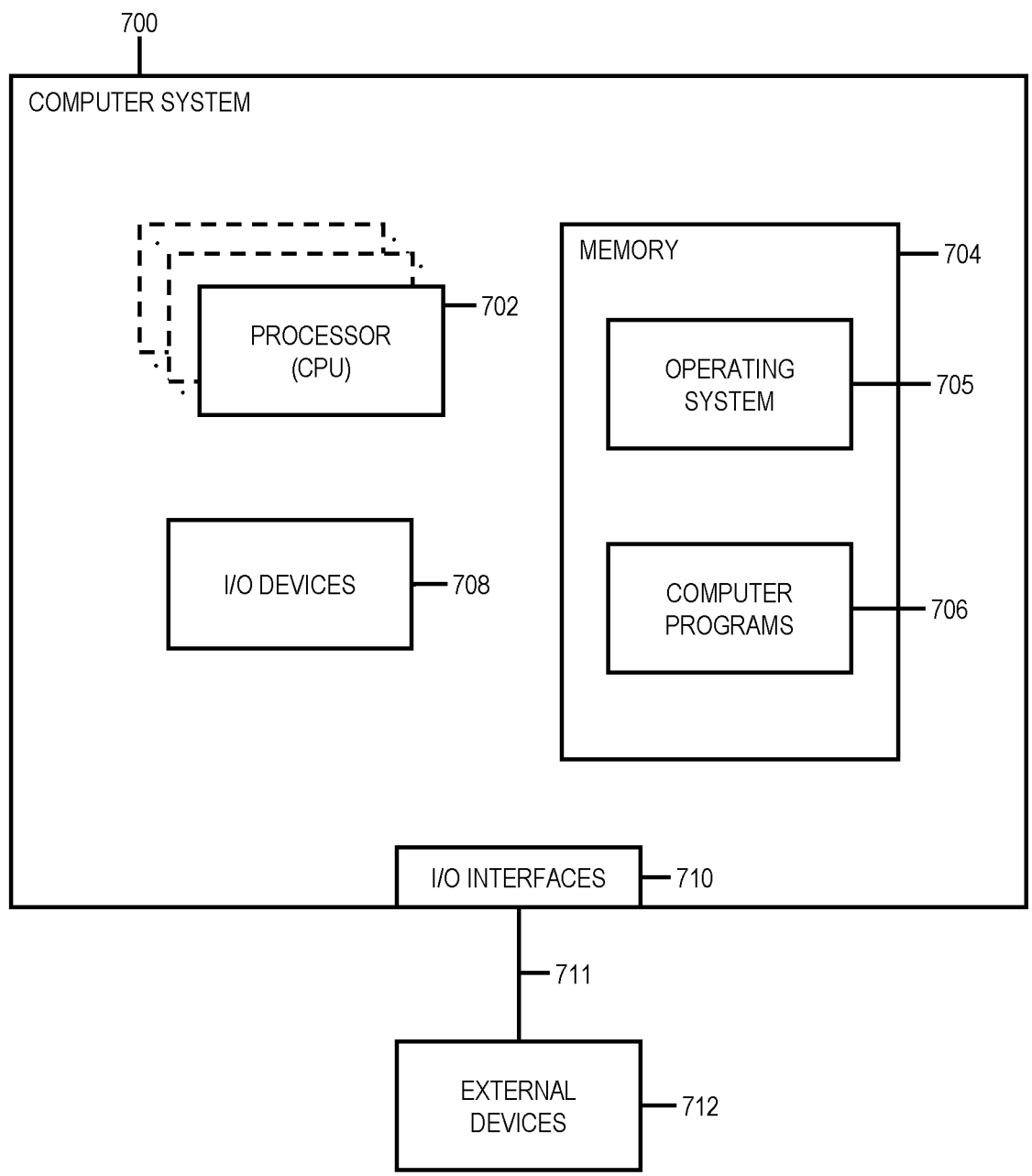
FIG. 7 depicts one example of a computer system and associated devices to incorporate and/or use aspects described herein.

Processes described herein may be performed singly or collectively by one or more computer systems. FIG. 7 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 7 shows a computer system 700 in communication with external device(s) 712. Computer system 700 includes one or more processor(s) 702, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 702 can also include register(s) to be used by one or more of the functional components. Computer system 700 also includes memory 704, input/output (I/O) devices 708, and I/O interfaces 710, which may be coupled to processor(s) 702 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 704 can be or include main or system memory (e.g. Random Access Memory) used in the execution of program instructions, storage device(s) such as hard drive(s), flash media, or optical media as examples, and/or cache memory, as examples. Memory 704 can include, for instance, a cache, such as a shared cache, which may be coupled to local caches (examples include L1 cache, L2 cache, etc.) of processor(s) 702. Additionally, memory 704 may be or include at least one computer program product having a set (e.g., at least one) of program modules, instructions, code or the like that is/are configured to carry out functions of embodiments described herein when executed by one or more processors.

Memory 704 can store an operating system 705 and other computer programs 706, such as one or more computer programs/applications that execute to perform aspects described herein. Specifically, programs/applications can include computer readable program instructions that may be configured to carry out functions of embodiments of aspects described herein.

Examples of I/O devices 708 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (712) coupled to the computer system through one or more I/O interfaces 710.

Computer system 700 may communicate with one or more external devices 712 via one or more I/O interfaces 710. Example external devices include a keyboard, a pointing device, a display, and/or any other devices that enable a user to interact with computer system 700. Other example external devices include any device that enables computer system 700 to communicate with one or more other computing systems or peripheral devices such as a printer. A network interface/adapter is an example I/O interface that enables computer system 700 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 710 and external devices 712 can occur across wired and/or wireless communications link(s) 711, such as Ethernet-based wired or wireless connections. Example wireless connections include cellular, Wi-Fi, Bluetooth®, proximity-based, near-field, or other types of wireless connections. More generally, communications link(s) 711 may be any appropriate wireless and/or wired communication link(s) for communicating data.

Particular external device(s) 712 may include one or more data storage devices, which may store one or more programs, one or more computer readable program instructions, and/or data, etc. Computer system 700 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 700 may be operational with numerous other general purpose or special purpose computing system environments or configurations. Computer system 700 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
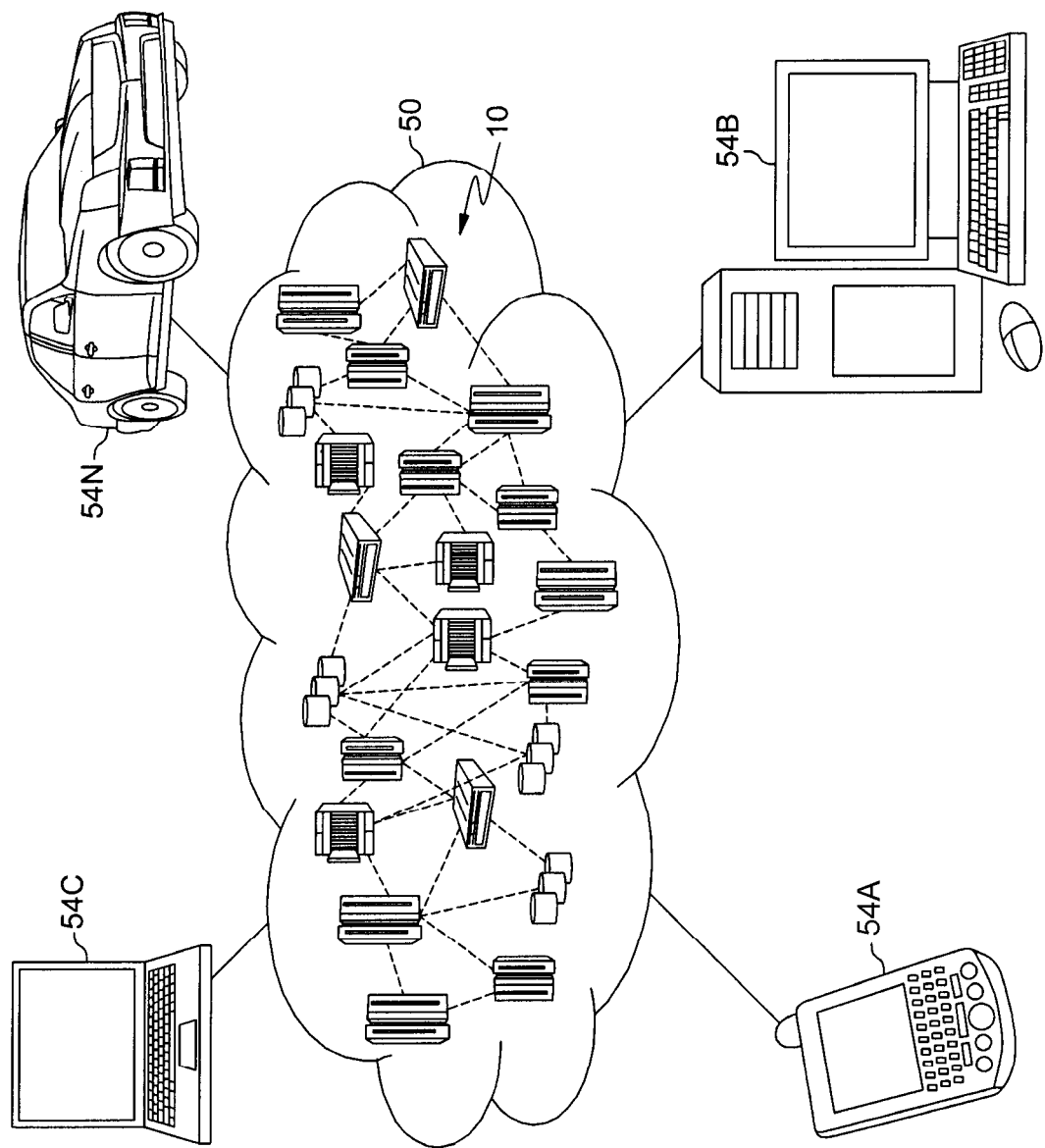
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
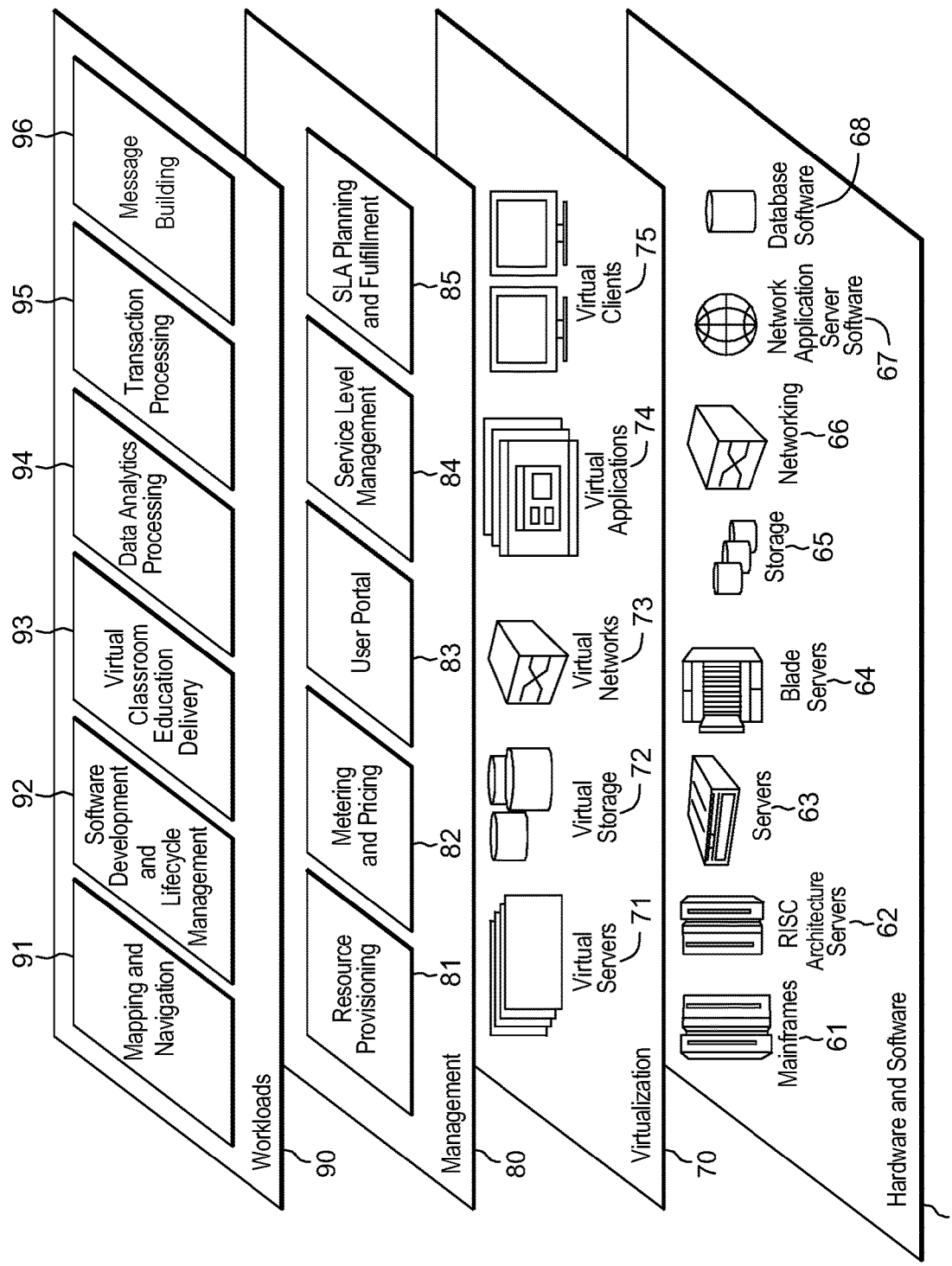
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message building in a user handwriting style 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining electronic source text from a user, the electronic source text to be sent to a recipient;
   ascertaining properties of the electronic source text, the properties comprising words used in the electronic source text and a context of the electronic source text, the context comprising an emotion of the electronic source text; and
   building an electronic message based on the ascertained properties, the electronic message comprising the electronic source text presented graphically in a handwriting style of the user, wherein the building the electronic message comprises composing the ascertained words as graphical elements of characters automatically generated to visually appear in the handwriting style of the user as if handwritten by the user, and wherein the composing is based on using a cascade classifier.

2. The method of claim 1, further comprising training a classifier using handwriting samples of the user's handwriting to learn the handwriting style of the user, and wherein the method further comprises acquiring at least some of the handwriting samples used to train the classifier from at least one of the group consisting of: (i) an interactive whiteboard on which the user handwrites words of the at least some of the handwriting samples; and (ii) a device with a touchscreen on which the user handwrites words of the at least some of the handwriting samples.

3. The method of claim 1, further comprising:
   building a knowledge corpus of words and phrases typically used by the user in handwritten messages in varying contexts; and
   determining from the knowledge corpus, and based on the ascertained context, words and phrases to suggest for inclusion in the electronic message as modifications to the text of the electronic source text.

4. The method of claim 1, wherein the electronic source text is provided in a first language of a plurality of languages, and wherein the building the electronic message composes the text of the electronic source text in a second language, of the plurality of different languages, different from the first language.

5. The method of claim 4, wherein the method further comprises automatically selecting the second language based on the ascertained context of the electronic source text.

6. The method of claim 4, wherein the electronic source text comprises an idiom of the first language, and wherein the building identifies a substitute idiom of the second language to substitute for the idiom of the first language in the built electronic message.

7. The method of claim 1, further comprising applying a trained machine learning model to the ascertained context of the electronic source text, the trained machine learning model configured to classify whether to convert source text into the handwriting style of the user, and automatically determining, based on the applying, to build the electronic message with the text source visually presented in the handwriting style of the user as if handwritten by the user.

8. The method of claim 1, wherein the electronic source text is provided by the user as one selected from the group consisting of:
a digital image of a message presented on a physical medium; a typed message from the user; and
a transcribed dictation from the user.

9. The method of claim 1, further comprising presenting the built electronic message in augmented reality (AR) on an AR device of the user, wherein the AR device visually presents the electronic source text in the handwriting style of the user overlaying the electronic source text as the user gazes to the electronic source text on a display device.

10. The method of claim 1, further comprising providing the electronic source text as an email along with the built electronic message for provision of the built electronic message on an augmented reality device of the recipient to overlay the electronic source text of the email.

11. A computer system comprising:
a memory; and
a processor in communication with the memory, wherein the computer system is configured to perform a method comprising:
obtaining electronic source text from a user, the electronic source text to be sent to a recipient;
ascertaining properties of the electronic source text, the properties comprising words used in the electronic source text and a context of the electronic source text, the context comprising an emotion of the electronic source text; and
building an electronic message based on the ascertained properties, the electronic message comprising the electronic source text presented graphically in a handwriting style of the user, wherein the building the electronic message comprises composing the ascertained words as graphical elements of characters automatically generated to visually appear in the handwriting style of the user as if handwritten by the user, and wherein the composing is based on using a cascade classifier.

12. The computer system of claim 11, wherein the method further comprises training a classifier using handwriting samples of the user's handwriting to learn the handwriting style of the user, and wherein the method further comprises acquiring at least some of the handwriting samples used to train the classifier from at least one of the group consisting of: (i) an interactive whiteboard on which the user handwrites words of the at least some of the handwriting samples; and (ii) a device with a touchscreen on which the user handwrites words of the at least some of the handwriting samples.

13. The computer system of claim 11, wherein the electronic source text is provided in a first language of a plurality of languages, and wherein the building the electronic message composes the text of the electronic source text in a second language, of the plurality of different languages, different from the first language.

14. The computer system of claim 11, wherein the method further comprises at least one selected from the group consisting of:
presenting the built electronic message in augmented reality (AR) on an AR device of the user, wherein the AR device visually presents the electronic source text in the handwriting style of the user overlaying the electronic source text as the user gazes to the electronic source text on a display device; and
providing the electronic source text as an email along with the built electronic message for provision of the built electronic message on an augmented reality device of the recipient to overlay the electronic source text of the email.

15. A computer program product comprising:
a computer readable storage medium readable by a processing circuit and storing instructions for execution by the processing circuit for performing a method comprising:
obtaining electronic source text from a user, the electronic source text to be sent to a recipient;
ascertaining properties of the electronic source text, the properties comprising words used in the electronic source text and a context of the electronic source text, the context comprising an emotion of the electronic source text; and
applying a trained machine learning model to the ascertained context of the electronic source text, the trained machine learning model configured to classify whether to convert source text into the handwriting style of the user;
automatically determining, based on the applying, to build an electronic message with the source text visually presented in the handwriting style of the user as if handwritten by the user; and
building the electronic message based on the ascertained properties, the electronic message comprising the electronic source text presented graphically in a handwriting style of the user.

16. The computer program product of claim 15, wherein the method further comprises training a classifier using handwriting samples of the user's handwriting to learn the handwriting style of the user, and wherein the method further comprises acquiring at least some of the handwriting samples used to train the classifier from at least one of the group consisting of: (i) an interactive whiteboard on which the user handwrites words of the at least some of the handwriting samples; and (ii) a device with a touchscreen on which the user handwrites words of the at least some of the handwriting samples.

17. The computer program product of claim 15, wherein the electronic source text is provided in a first language of a plurality of languages, and wherein the building the electronic message composes the text of the electronic source text in a second language, of the plurality of different languages, different from the first language.

18. The computer program product of claim 15, wherein the method further comprises at least one selected from the group consisting of:
presenting the built electronic message in augmented reality (AR) on an AR device of the user, wherein the AR device visually presents the electronic source text in the handwriting style of the user overlaying the electronic source text as the user gazes to the electronic source text on a display device; and providing the electronic source text as an email along with the built electronic message for provision of the built electronic message on an augmented reality device of the recipient to overlay the electronic source text of the email.

19. The computer program product of claim 15, wherein the building the electronic message comprises composing the ascertained words as graphical elements of characters automatically generated to visually appear in the handwriting style of the user as if handwritten by the user, and wherein the composing is based on using a cascade classifier.

\* \* \* \* \*